United States Patent
Shao (10) Patent No.: US 12,144,059 B2
(45) Date of Patent: Nov. 12, 2024

(54) ROAMING SIGNALING MESSAGE SENDING METHOD, RELATED DEVICE, AND COMMUNICATIONS SYSTEM

(71) Applicant: Huawei Technologies Co., Ltd., Shenzhen (CN)

(72) Inventor: Guoqiang Shao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 17/708,830

(22) Filed: Mar. 30, 2022

(65) Prior Publication Data

US 2022/0225075 A1 Jul. 14, 2022

Related U.S. Application Data

(63) Continuation of application No. PCT/CN2020/100219, filed on Jul. 3, 2020.

(30) Foreign Application Priority Data

Sep. 30, 2019 (CN) .......................... 201910944236.3

(51) Int. Cl.
*H04W 8/12* (2009.01)
*H04L 67/14* (2022.01)
(Continued)

(52) U.S. Cl.
CPC .............. *H04W 8/12* (2013.01); *H04L 67/14* (2013.01); *H04L 67/148* (2013.01); *H04L 67/51* (2022.05);
(Continued)

(58) Field of Classification Search
CPC ....... H04L 67/51; H04L 67/14; H04L 67/148; H04W 8/12; H04W 8/04; H04W 8/06; H04W 12/069

See application file for complete search history.

(56) References Cited

U.S. PATENT DOCUMENTS

| 10,361,843 | B1 | 7/2019 | Suthar et al. |
| 2019/0253885 | A1 | 8/2019 | Bykampadi et al. |

(Continued)

FOREIGN PATENT DOCUMENTS

| CN | 109699031 A | 4/2019 |
| CN | 110167013 A | 8/2019 |

(Continued)

OTHER PUBLICATIONS

3GPP TS 29.500 V16.1.0, Sep. 2019, "3rd Generation Partnership Project; Technical Specification Group Core Network and Terminals; 5G System; Technical Realization of Service Based Architecture; Stage 3 (Release 16)," 43 pages.

(Continued)

*Primary Examiner* — Elton Williams
(74) *Attorney, Agent, or Firm* — Conley Rose, P.C.

(57) ABSTRACT

A roaming signaling message sending method, where after receiving a roaming signaling message, a visited core network device adds an identifier of a home core network device and an identifier of a visited SEPP into the roaming signaling message, and then sends a roaming signaling message including the identifier of the home core network device and the identifier of the visited SEPP to the visited SEPP, such that the visited SEPP can forward the roaming signaling message to a home network based on the identifier of the home core network device.

20 Claims, 6 Drawing Sheets

(51) Int. Cl.
*H04L 67/148* (2022.01)
*H04L 67/51* (2022.01)
*H04W 8/04* (2009.01)
*H04W 8/06* (2009.01)
*H04W 12/069* (2021.01)

(52) U.S. Cl.
CPC .............. *H04W 8/04* (2013.01); *H04W 8/06* (2013.01); *H04W 12/069* (2021.01)

(56) References Cited

U.S. PATENT DOCUMENTS

| | | |
|---|---|---|
| 2019/0260803 A1 | 8/2019 | Bykampadi et al. |
| 2020/0036754 A1* | 1/2020 | Livanos ................ H04W 48/16 |

FOREIGN PATENT DOCUMENTS

| | | |
|---|---|---|
| EP | 3528456 A1 | 8/2019 |
| WO | 2019137490 A1 | 7/2019 |
| WO | 2019158818 A1 | 8/2019 |
| WO | 2019159567 A1 | 8/2019 |

OTHER PUBLICATIONS

3GPP TS 29.573 V16.0.0, Sep. 2019, "3rd Generation Partnership Project; Technical Specification Group Core Network and Terminals; 5G System; Public Land Mobile Network (PLMN) Interconnection; Stage 3 (Release 16)," 79 pages.
3GPP TS 33.501 V16.0.0, Sep. 2019, "3rd Generation Partnership Project; Technical Specification Group Services and System Aspects; Security architecture and procedures for 5G system (Release 16)," 196 pages.
Deutsche Telekom AG, "Discussion on SBA Message Routing," 3GPP TSG CT WG3 Meeting #101, C3-190238, Montreal, Canada, Feb. 25-Mar. 1, 2019, 5 pages.
Deutsche Telekom AG, "Discussion on SBA Message Routing," 3GPP TSG CT WG4 Meeting #89, C4-190211, Montreal, Canada, Feb. 25-Mar. 1, 2019, 4 pages.
Huawei, "Informative Annex on End to End Call Flow via SEPP," 3GPP TSG-CT WG4 Meeting #90, C4-191415, Xi'an, P.R.China; Apr. 8-12, 2019, 13 pages.
Ericsson, "Telescopic FQDN Mapping Service," 3GPP Tsg-Ct WG4 Meeting #93, C4-193728, Wroclaw, Poland; Aug. 26-30, 2019, 9 pages.
Wen Xuhua et al., "Research on Solution to 5G International Roaming Networks," Mobile Communications, 2018, with an English abstract, 6 pages.
E. Rescorla, "HTTP Over Tls," Rfc 2818, May 2000, 7 pages.
E. Rescorla, et al., "The Transport Layer Security (TLS) Protocol Version 1.3," RFC 8446, Aug. 2018, 160 pages.
Ericsson, "SBA: Token Based Authorization for the inter-PLMN case," 3GPP TSG SA WG3 (Security) Meeting #91, S3-181408, Apr. 16-20, 2018, Belgrade (Serbia), 2 pages.
Huawei, "Discussion on TLS and Inter PLMN Routing through SEPP," 3GPP TSG CT WG4 Meeting #85bis, C4-185052, Sophia Antipolis, France, Jul. 9-Jul. 13, 2018, 6 pages.
3GPP, 3GPP TS 29.573 V15.3.0, Sep. 2019, 3rd Generation Partnership Project; Technical Specification Group Core Network and Terminals; 5G System; Public Land Mobile Network (PLMN) Interconnection; Stage 3, section 4. 2. 1 and section C. 2. 2, 9 pages.
Tim, Analysis of different approaches for implementing SBA security overN32 reference point, 3GPP TSG SA WG3 #90, S3-180028, Jan. 22, 2018, 8 pages.
Huawei, Hisilicon, Update of solution #15 in TR 33.855, 3GPP TSG SA WG3 #96, S3-193097, Aug. 30, 2019, 7 pages.

* cited by examiner

ROAMING SIGNALING MESSAGE SENDING METHOD, RELATED DEVICE, AND COMMUNICATIONS SYSTEM

CROSS-REFERENCE TO RELATED APPLICATIONS

This is a continuation of International Patent Application No. PCT/CN2020/100219, filed on Jul. 3, 2020, which claims priority to Chinese Patent Application No. 201910944236.3, filed on Sep. 30, 2019. The disclosures of the aforementioned applications are hereby incorporated by reference in their entireties.

TECHNICAL FIELD

This application relates to the field of communications technologies, and in particular, to a roaming signaling message sending method, a related device, and a communications system.

BACKGROUND

The 5th generation (5G) mobile communications technology is a latest generation cellular mobile communications technology. Performance goals of a 5G network are a high data rate, a reduced latency, energy saving, reduced costs, an increased system capacity, and large-scale device connectivity.

In a 5G core (5GC) network, a security edge protection proxy (SEPP) device serves as a border security gateway of the 5GC, and may implement interconnection between 5G networks of different operators. When a 5G subscriber roams, a roaming signaling message of a network device (network element) inside the 5GC is forwarded to a home 5G network through a SEPP device (which is briefly referred to as SEPP below).

In an existing roaming signaling message sending method, a visited network repository function (NRF) device receives a roaming signaling message sent by a network element, and sends an address request message that carries an identifier of a home NRF to a visited SEPP; and the visited SEPP returns a virtual identifier of the visited SEPP to the visited NRF, and stores a correspondence between the identifier of the home NRF and the virtual identifier of the visited SEPP.

Subsequently, the NRF sends a roaming signaling message to the visited SEPP, where the roaming signaling message carries the virtual identifier of the visited SEPP. After receiving the roaming signaling message sent by the NRF, the visited SEPP replaces the virtual identifier of the visited SEPP carried in the roaming signaling message with the identifier of the home NRF, and sends a roaming signaling message obtained through the replacement to a home SEPP. The home SEPP forwards the received roaming signaling message to the home NRF for subsequent processing.

In an existing roaming signaling message sending process, the visited SEPP needs to perform signaling interaction with the visited NRF for a plurality of times, and the visited SEPP further needs to store the correspondence between the identifier of the home NRF and the virtual identifier of the visited SEPP. As a result, roaming signaling message forwarding efficiency is relatively low, and device costs are increased.

SUMMARY

This application provides a roaming signaling message sending method, a related device, and a communications system, to resolve a problem in the conventional technology that message forwarding efficiency is low because a visited SEPP needs to perform signaling interaction with an NRF for a plurality of times.

According to a first aspect, an embodiment of this application provides a roaming signaling message forwarding method. The method mainly includes the following steps.

A visited core network device receives a roaming signaling message, and adds an identifier of a home core network device and an identifier of a visited SEPP device into the roaming signaling message. Then, the visited core network device sends a roaming signaling message including the identifier of the home core network device and the identifier of the visited SEPP device to the visited SEPP device.

According to the solution provided in the first aspect, the visited core network device does not need to obtain a virtual identifier of the visited SEPP device from the visited SEPP device, but sends the roaming signaling message including the identifier of the home core network device and the identifier of the visited SEPP device to the visited SEPP, such that the visited SEPP device can forward the roaming signaling message to a home network based on the identifier of the home core network device. In comparison with the conventional technology, this solution reduces a quantity of times of signaling interaction between the visited SEPP device and the visited core network device, improves message forwarding efficiency, and improves stability of a communications system.

In an implementation solution, the visited core network device may further start to establish a security link (or a security connection) with the visited SEPP device, and then receive a security certificate sent by the visited SEPP device. Then, the visited core network device verifies (or checks) the security certificate based on the identifier of the visited SEPP device in the roaming signaling message. After the verification succeeds, the visited core network device sends the roaming signaling message including the identifier of the home core network device and the identifier of the visited SEPP device to the visited SEPP device.

In this implementation solution, before the roaming signaling message is sent to the visited SEPP device, a step of verifying security of the visited SEPP device is added. This enhances security of the communications system.

In an implementation solution, the roaming signaling message received by the visited core network device carries an identifier of the home network. In this case, the visited core network device generates the identifier of the home core network device based on the identifier of the home network. Subsequently, the visited core network device may add the generated identifier of the home core network device into the received roaming signaling message.

In an implementation solution, the visited core network device may add the identifier of the visited SEPP device into a header of the roaming signaling message, such that the visited SEPP device identifies that the roaming signaling message is sent to the visited SEPP device.

According to a second aspect, this application provides a roaming signaling message sending method, where the method is mainly implemented by a visited SEPP device, and the method includes the following steps.

The visited SEPP device receives a roaming signaling message sent by a visited core network device, where the roaming signaling message includes an identifier of a home core network device and an identifier of the visited SEPP device. Then, the visited SEPP device replaces the identifier of the visited SEPP device in the roaming signaling message with the identifier of the home core network device. After the replacement is completed, the visited SEPP device sends a roaming signaling message obtained through the replacement to a home SEPP device.

In the implementation solution provided in this aspect, the visited SEPP device may replace the identifier of the visited SEPP device in the received roaming signaling message with the identifier of the home core network device in the roaming signaling message. The visited SEPP device does not need to store a correspondence between a virtual identifier of the visited SEPP device and an identifier of a home NRF in advance. This saves storage resources. After the visited SEPP device recovers from a fault, the correspondence does not need to be restored. This improves working stability of the visited SEPP device, and reduces implementation and deployment costs of the SEPP device.

In an implementation solution, the visited SEPP device further starts to establish a security link with the visited core network device, and the visited SEPP device sends a security certificate to the visited core network device, in order to ensure security of communication between the visited core network device and the visited SEPP device.

In an implementation solution, the visited SEPP device replaces the identifier of the visited SEPP device in a header of the roaming signaling message with the identifier of the home core network device. In this way, after the roaming signaling message is sent to the home SEPP device, the home SEPP device may learn, based on the header of the roaming signaling message, that the message is to be sent to the home core network device.

According to a third aspect, this application provides a core network device, and the core network device mainly includes: a memory and a processor that are coupled to each other, where the memory stores program code, and the processor invokes and executes the program code stored in the memory, such that the core network device performs the roaming signaling message sending method according to the first aspect. For beneficial effects of the core network device provided in this aspect, refer to the description in the first aspect.

In an implementation solution, the core network device may be deployed in a visited network of user equipment, and serves as a visited core network device.

In an implementation solution, the core network device further includes a transceiver configured to communicate with another device.

According to a fourth aspect, this application provides a security edge protection proxy device, and the security edge protection proxy device mainly includes: a memory and a processor that are coupled to each other, where the memory stores program code, and the processor invokes and executes the program code stored in the memory, such that the security edge protection proxy device performs the roaming signaling message sending method according to the second aspect. For beneficial effects of the SEPP device provided in this aspect, refer to the description in the second aspect.

In an implementation solution, the security edge protection proxy device may be deployed in a visited network of user equipment, and serves as a visited security edge protection proxy device.

In an implementation solution, the SEPP device further includes a transceiver configured to communicate with another device.

According to a fifth aspect, this application provides a communications system, and the communications system mainly includes: a visited core network device and a visited security edge protection proxy SEPP device, where the visited core network device is configured to implement the roaming signaling message sending method according to the first aspect; and the visited SEPP device is configured to implement the roaming signaling message sending method according to the second aspect.

In an implementation solution, the visited core network device and the visited security edge protection proxy device each may be implemented using a general-purpose computer architecture, and include a memory and a processor. The visited core network device may be the device described in the third aspect, and the SEPP device may be the device described in the fourth aspect.

The communications system provided in this aspect has beneficial effects of the roaming signaling message sending methods provided in the foregoing two aspects.

According to a sixth aspect, this application further provides a visited core network device, where the device mainly includes a first receiving unit, a message processing unit, and a first sending unit.

The first receiving unit is configured to receive a roaming signaling message. The message processing unit is configured to add an identifier of a home core network device and an identifier of a visited SEPP device into the roaming signaling message. The first sending unit is configured to send a roaming signaling message including the identifier of the home core network device and the identifier of the visited SEPP device to the visited SEPP.

In an implementation solution, the visited core network device further includes: a link establishment unit configured to start to establish a security link with the visited SEPP device, where the first receiving unit is further configured to receive a security certificate sent by the visited SEPP device; and a verification unit configured to verify the security certificate based on the identifier of the visited SEPP device in the roaming signaling message, where after the verification succeeds, the first sending unit is further configured to send the roaming signaling message including the identifier of the home core network device and the identifier of the visited SEPP device to the visited SEPP device.

In an implementation solution, the roaming signaling message received by the first receiving unit in the visited core network device carries an identifier of a home network, and the visited core network device further includes: a generation unit configured to generate the identifier of the home core network device based on the identifier of the home network.

In an implementation solution, the identifier of the visited SEPP device is located in a header of the roaming signaling message. To be more specific, the message processing unit adds the identifier of the visited SEPP device into the header of the roaming signaling message, and adds the identifier of the home core network device into an extension field of the roaming signaling message.

For beneficial effects of the visited core network device provided in the sixth aspect, refer to the description in the first aspect.

According to a seventh aspect, this application further provides a visited SEPP device, where the visited SEPP device mainly includes: a second receiving unit, a message replacement unit, and a second sending unit.

The second receiving unit is configured to receive a roaming signaling message sent by a visited core network device, where the roaming signaling message includes an identifier of a home core network device and an identifier of the visited SEPP device.

The message replacement unit is configured to replace the identifier of the visited SEPP device in the roaming signaling message with the identifier of the home core network device.

The second sending unit is configured to send a roaming signaling message obtained through the replacement to a home SEPP device.

In an implementation solution, the visited SEPP device further includes: a link establishment unit configured to start to establish a security link with the visited core network device, where the second sending unit is further configured to send a security certificate to the visited core network device.

In an implementation solution, the message replacement unit in the visited SEPP device replaces the identifier of the visited SEPP in a header of the roaming signaling message with the identifier of the home core network device.

For beneficial effects of the visited SEPP device provided in the seventh aspect, refer to the description in the second aspect.

According to an eighth aspect, this application further provides a computer-readable storage medium. The computer-readable storage medium stores instructions; and when the instructions are run on a computer, the computer is enabled to perform the methods according to the foregoing aspects.

According to a ninth aspect, this application further provides a computer program product including instructions. When the computer program product is run on a computer, the computer is enabled to perform the methods according to the foregoing aspects.

According to a tenth aspect, this application further provides a computer chip. The chip is connected to a memory. The chip is configured to read and execute a software program stored in the memory, to perform the methods according to the foregoing aspects.

In the technical solution in any one of the foregoing aspects, the visited core network device may be a visited NRF device or a visited NSSF device.

In the technical solution in any one of the foregoing aspects, the roaming signaling message may be a service discovery request or a network slice request.

In the technical solution in any one of the foregoing aspects, the roaming signaling message is a Hypertext Transfer Protocol Secure (HTTPS) message.

In the technical solution in any one of the foregoing aspects, the identifier of the visited SEPP device is a fully qualified domain name (FQDN) of the visited SEPP device, the identifier of the visited core network device is an FQDN of the visited core network device, and the identifier of the home core network device is an FQDN of the home core network device.

DESCRIPTION OF EMBODIMENTS

To make the objectives, technical solutions, and advantages of this application clearer, the following further describes this application in detail with reference to the accompanying drawings. An operation method in a method embodiment may also be applied to an apparatus embodiment or a system embodiment.

Figure 1:
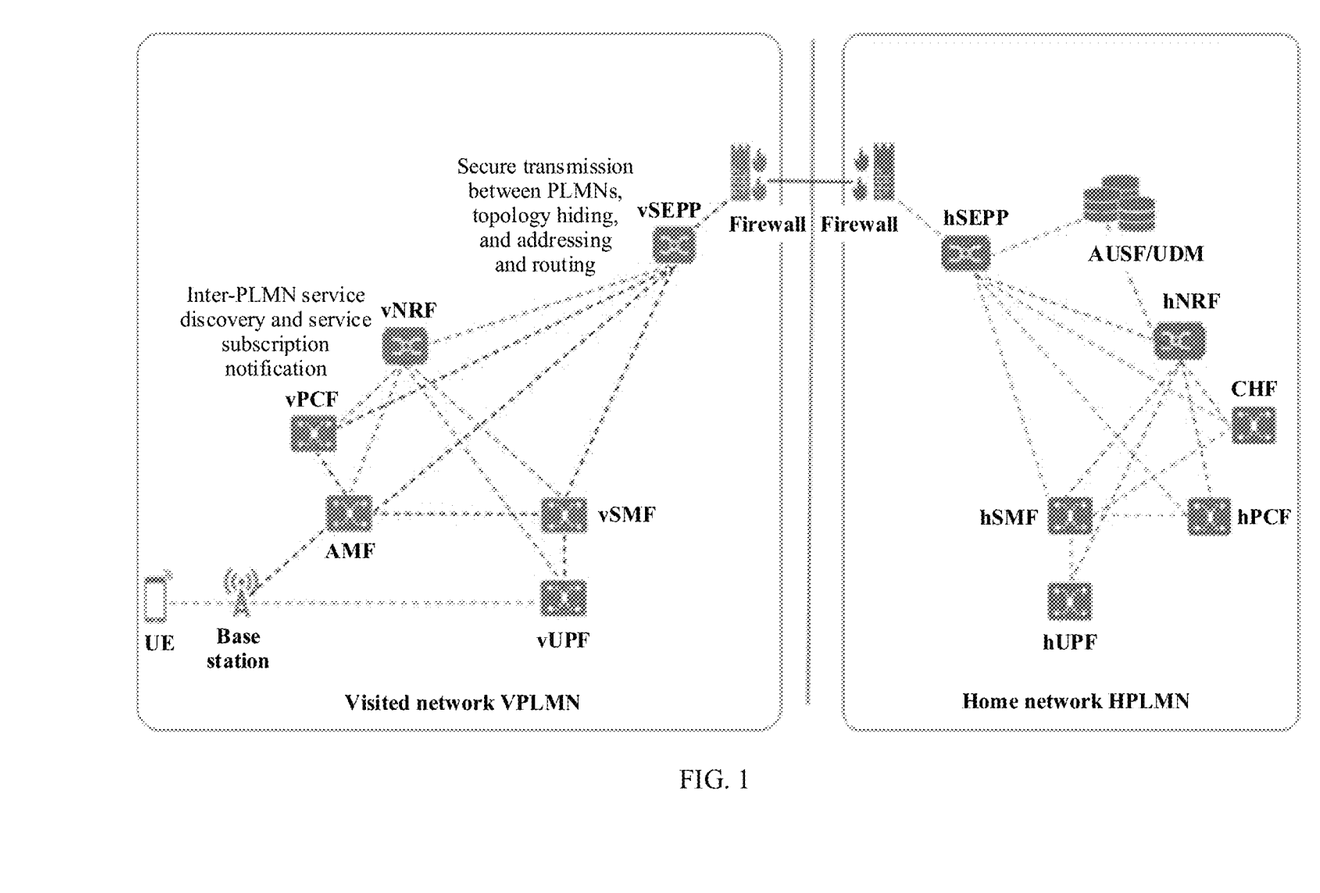
FIG. 1 is a schematic diagram of a network architecture of a 5G roaming scenario according to an embodiment of this application.
Figure 2:
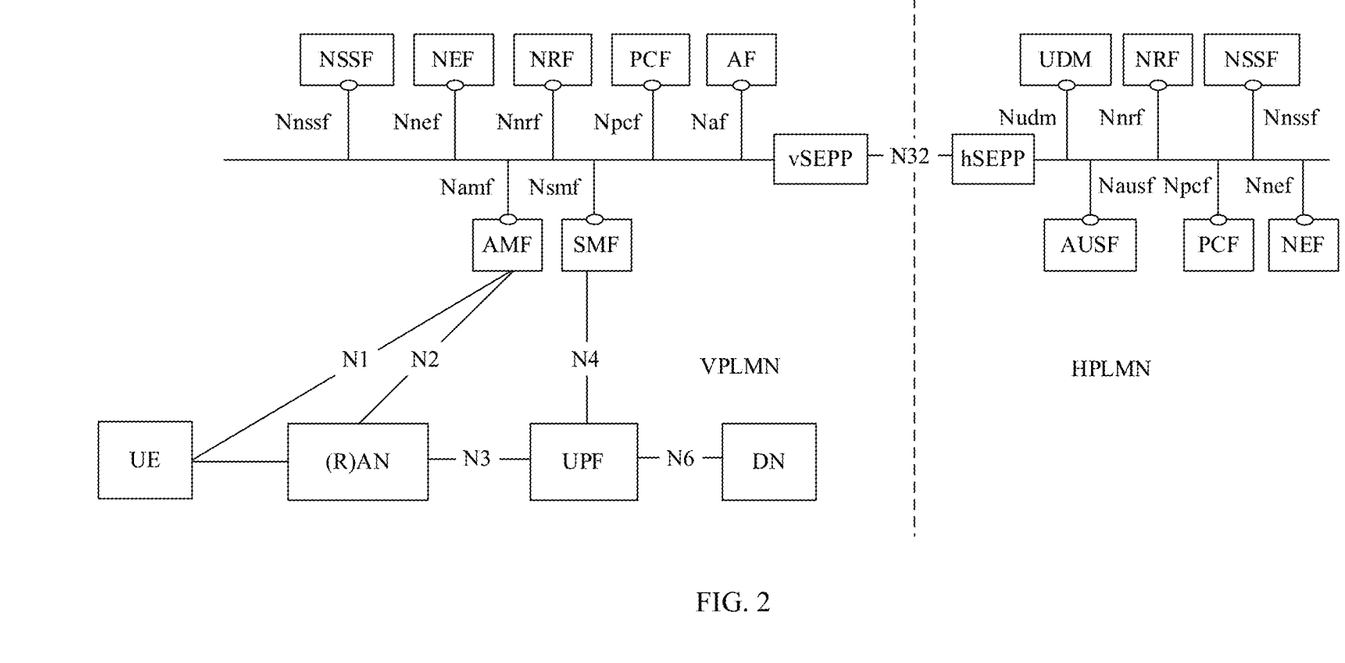
FIG. 2 is a schematic diagram of interfaces between devices in a 5G network according to an embodiment of this application.

Refer to FIG. 1 and FIG. 2. FIG. 1 is a schematic diagram of a network architecture of a 5G roaming scenario according to an embodiment of this application. FIG. 2 is a schematic diagram of interfaces between devices in a 5G network.

As shown in FIG. 1, a user equipment (UE) roams from a home public land mobile network (HPLMN) to a visited public land mobile network (VPLMN), and uses a data service in the visited public land mobile network. The home public land mobile network is briefly referred to as a home network (which may also be referred to as a local network), and the visited public land mobile network is briefly referred to as a visited network.

A firewall is used to isolate the visited network from the home network to ensure security. Signaling between the visited network and the home network is transmitted through an N32 interface between a visited SEPP (vSEPP) and a home SEPP (hSEPP). In addition, a SEPP can hide a topology of a PLMN network, and address and route a signaling message. The SEPP may also be referred to as a border security gateway. The visited SEPP and the home SEPP may be directly connected through the N32 interface, or may be connected through an Internet Protocol (IP) packet exchange (IPX) device, that is, a message between the SEPPs is forwarded by the IPX device.

In this embodiment, the home network and the visited network each use a 5G architecture. The following describes functions and interfaces of related devices in the 5G network with reference to FIG. 2.

An access and mobility management function (AMF) device is a control plane network element in a 3rd Generation Partnership Project (3GPP) network, and is mainly responsible for access control and mobility management for a UE to access an operator's network. A security anchor function (SEAF) may be deployed in the AMF device (AMF), or the SEAF may be deployed in another device different from the AMF. In FIG. 2, an example in which the SEAF is deployed in the AMF is used. When the SEAF is deployed in the AMF, the SEAF and the AMF may be jointly referred to as an AMF.

A session management function (SMF) device is a control plane network element in the 3GPP network, and the SMF device (SMF) is mainly responsible for managing a packet data unit (PDU) session of the UE. The UE and a data network may send a data packet to each other using a PDU session. The SMF is responsible for management tasks such as establishment, maintenance, and deletion of the PDU session.

The data network (DN) is also referred to as a packet data network (PDN), and is a network outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of the UE, and a control server of the sensor is deployed in the DN. The UE communicates with the control server. After obtaining an instruction from the control server, the UE may transfer collected data to the control server according to the instruction.

A unified data management (UDM) device is also a control plane network element in the 3GPP network. The UDM device (UDM) is mainly responsible for storing subscription data, a credential, a subscription persistent identifier (e.g., subscription Permanent Identifier (SUPI)), and the like of a subscriber in the 3GPP network. The data may be used for authentication and authorization when the UE accesses a 3GPP network of an operator.

An authentication server function (AUSF) device is also a control plane network element in the 3GPP network, and the AUSF device is mainly used for first-level authentication (that is, authentication performed by the 3GPP network on the subscriber).

A network exposure function (NEF) device is also a control plane network element in the 3GPP network. The NEF device (NEF) is mainly responsible for securely exposing an external interface of the 3GPP network to a third party. When a network element such as the SMF needs to communicate with a third party network element, the NEF may serve as a relay for communication. For example, when an SUPI of the UE is sent from the 3GPP network to the third party, the NEF may translate the SUPI into an external identity (ID) corresponding to the SUPI. Conversely, when an external identity ID is sent to the 3GPP network, the NEF may translate the external identity ID into a corresponding SUPI.

A charging function (CHF) device is configured to perform charging for user equipment using a 5G network, for example, perform online charging or offline charging for traffic generated when the UE uses the 5G network. When a subscriber roams, charging control for the subscriber can be performed in a home network.

A network repository function (NRF) device is also a control plane network element in the 3GPP network, and is mainly responsible for storing a configuration and a service profile of an accessible network function (NF), and providing a network function discovery service for another network element. Through network discovery, network elements can be selected for communication.

An application function (AF) device is configured to provide application-related functions, for example, a voice call function and a conference function.

A user plane function (UPF) device is a gateway for communication between the 3GPP network and the DN, and may be configured to forward a data packet, control a policy, report usage, and the like.

A policy control function (PCF) device is a control plane function in the 3GPP network, and is configured to provide a policy of a PDU session for the SMF. The policy may include a charging policy, a quality of service (QOS) policy, an authorization-related policy, or the like.

The NEF, the NRF, the PCF, the UDM, the AF, the CHF, the AUSF, the AMF, the SMF, and the UPF are devices in a 5G core network.

An access network (AN) is a sub-network of the 3GPP network. The UE accesses the 3GPP network through the AN. In a radio access scenario, the AN is also referred to as a radio access network (RAN). Therefore, terms "RAN" and "AN" are usually interchangeable without differentiation.

The 3GPP network is a network that complies with a 3GPP standard. In FIG. 2, parts other than the UE and the DN may be considered as a 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, N6, and the like in the architecture shown in FIG. 2 represent reference points (Reference Point) between related network elements/network functions. The 5G network uses a service-oriented architecture. Nausf, Namf, and the like represent service-oriented interfaces of related network functions. Certainly, the 3GPP network and a non-3GPP network may coexist, and some network elements in the 5G network may also be used in some non-5G networks.

For example, a part or all of core network functions in the 5G architecture shown in FIG. 2 can be virtualized. A part or all of core network functions in 3G, 4G, or another network architecture can also be virtualized. Examples are not listed one by one herein.

The conventional technology provides a roaming signaling message sending method. In the method, a visited NRF receives a roaming signaling message sent by a network element, and sends an address request message that carries an identifier of a home NRF to a visited SEPP; and the visited SEPP returns a virtual identifier of the visited SEPP to the NRF, and stores a correspondence between the identifier of the home NRF and the virtual identifier of the visited SEPP. However, after obtaining the virtual identifier of the visited SEPP, the visited NRF receives a security certificate sent by the visited SEPP, and the visited NRF needs to verify the security certificate using the virtual identifier of the visited SEPP. The visited NRF can send a roaming signaling message to the visited SEPP only after the verification succeeds.

In this application, after receiving the roaming signaling message, the visited NRF does not need to obtain the virtual identifier of the visited SEPP from the visited SEPP, but adds an identifier of the visited SEPP into the roaming signaling message. In this case, when the security certificate sent by the visited SEPP is subsequently received, the identifier of the visited SEPP that is added into the roaming signaling message is used to verify the security certificate. In this way, after security verification succeeds, the roaming signaling message can be sent to the visited SEPP. In comparison with the conventional technology, the technical solutions provided in this application not only can meet a security verification requirement, but also can avoid a case in which signaling interaction between the visited NRF and the visited SEPP needs to be performed for a plurality of times. This saves resources, and improves roaming signaling message sending efficiency.

Figure 3:
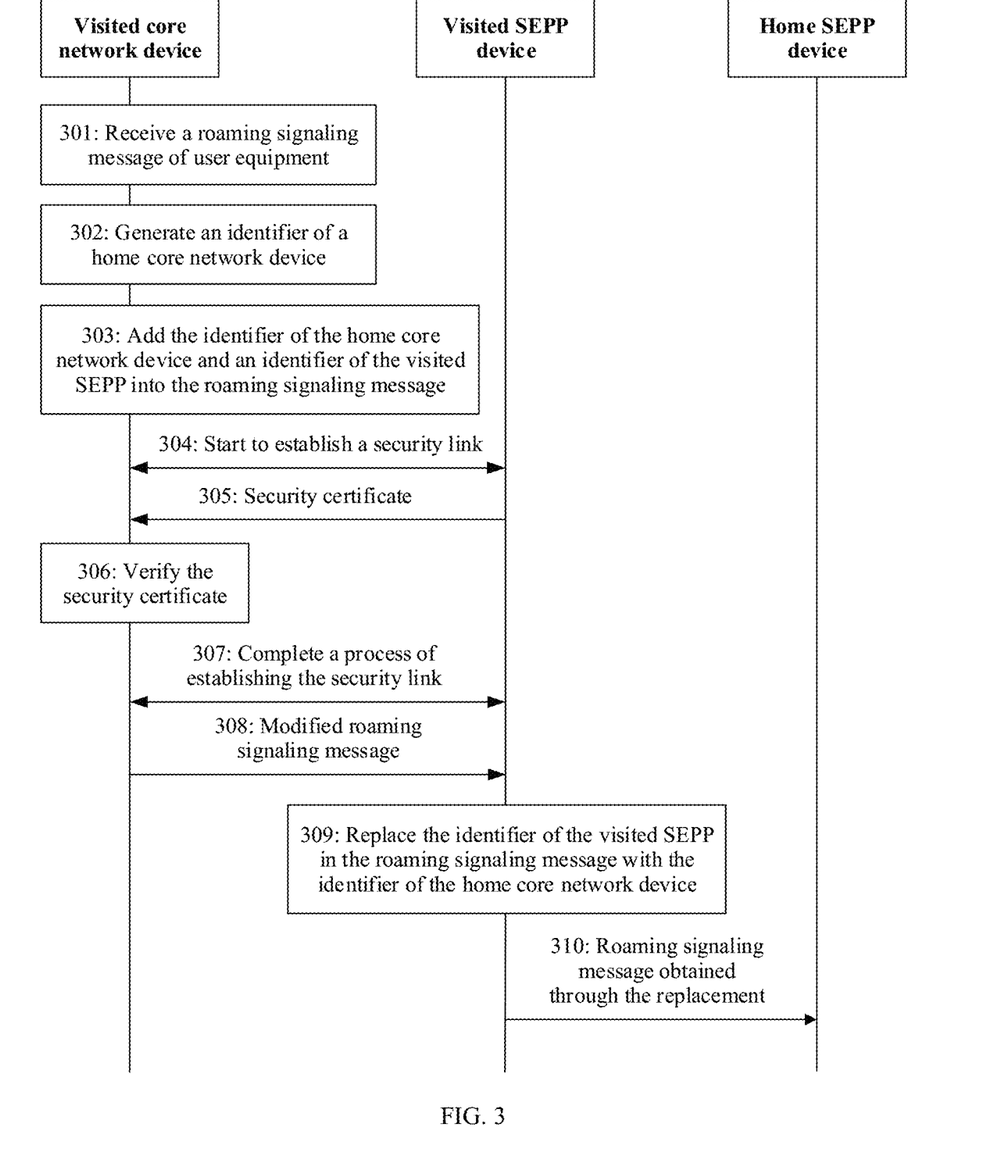
FIG. 3 is a flowchart of a roaming signaling message sending method according to an embodiment of this application.

Based on the network system shown in FIG. 1 and FIG. 2, the following describes a roaming signaling message sending method provided in an embodiment of this application. As shown in FIG. 3, the method includes the following steps.

Step 301: A visited core network device receives a roaming signaling message of user equipment.

The user equipment roams from a home location to a visited location, and initiates a service request. The visited core network device receives the roaming signaling message of the user equipment. For example, the roaming signaling message may be a service discovery request, to obtain an address of a UDM or a PCF that provides a service for the user equipment. The roaming signaling message may alternatively be a charging request, and is used to request a home charging system to perform charging for the user equipment.

In this embodiment, the visited core network device may be a visited NRF or a visited network slice selection function (NSSF) device. The visited NRF or the visited NSSF device receives the roaming signaling message of the user equipment that is sent by another network element (for example, an AMF/SMF) in a core network. The visited NRF may support a service discovery function, such that network elements can be selected for communication. The visited NSSF device selects, based on received information and a local configuration, an AMF that can serve the UE, a network slice instance that can serve the UE, or the like.

Step 302: The visited core network device generates an identifier of a home core network device based on an identifier of a home network that is carried in the roaming signaling message.

The roaming signaling message carries the identifier of the home network of the user equipment, for example, an HPLMN ID. The visited core network device may generate the identifier of the home core network device based on the identifier of the home network. The identifier of the home core network device may be a fully qualified domain name (FQDN), a physical address, an IP address, or the like of the home core network device. The home core network device may be a home AMF, a home UDM, a home charging system, or the like.

Step 303: The visited core network device adds the identifier of the home core network device and an identifier of a visited SEPP into the roaming signaling message.

In this embodiment, the visited core network device may add the identifier of the home core network device and the identifier of the visited SEPP into different fields of the roaming signaling message. For example, the identifier of the visited SEPP is added into a header of the roaming signaling message, and the identifier of the home core network device is added into an extension field (or an extension header field).

The identifier of the visited SEPP may be an FQDN, a physical address, an IP address, or the like of the visited SEPP.

Step 304: The visited core network device starts to establish a security link with the visited SEPP.

In this embodiment, a handshake hello message is sent between the visited core network device and the visited SEPP to establish a transport layer security (TLS) link. In a process of establishing the security link (or a security connection), the visited SEPP sends a security certificate to the visited core network device. The identifier of the visited SEPP may be configured on the visited core network device, in order to send a hello message to the visited SEPP.

Step 305: The visited core network device receives the security certificate sent by the visited SEPP.

Step 306: The visited core network device verifies the security certificate based on the identifier of the visited SEPP in the roaming signaling message.

To prevent a spoofing attack (spoofing the visited SEPP), the visited core network device may verify the visited SEPP. Therefore, the visited core network device verifies the security certificate based on the identifier of the visited SEPP in the roaming signaling message.

In this embodiment, the visited core network device verifies the received security certificate using the identifier of the visited SEPP in the header of the roaming signaling message. The security certificate carries the identifier of the visited SEPP, and the header of the roaming signaling message also carries the identifier of the visited SEPP. Therefore, the security verification succeeds.

Step 307: The visited core network device and the visited SEPP complete the process of establishing the security link.

In this embodiment, after the verification succeeds, the visited core network device and the visited SEPP continue the process of establishing the security link, for example, send a finished message to each other.

Step 308: The visited core network device sends a roaming signaling message including the identifier of the home core network device and the identifier of the visited SEPP to the visited SEPP.

The visited core network device sends a modified roaming signaling message (that is, the roaming signaling message into which the identifier of the home core network device and the identifier of the visited SEPP are added) in step 303 to the visited SEPP.

The visited SEPP receives the roaming signaling message sent by the visited core network device, where the roaming signaling message includes the identifier of the home core network device and the identifier of the visited SEPP.

Step 309: The visited SEPP replaces the identifier of the visited SEPP in the roaming signaling message with the identifier of the home core network device.

In this embodiment, if the visited SEPP determines that the header of the roaming signaling message carries the identifier of the visited SEPP, that is, the identifier of the visited SEPP, the visited SEPP replaces the identifier of the visited SEPP in the roaming signaling message with the identifier of the home core network device. After the replacement, the header of the roaming signaling message carries the identifier of the home core network device.

In this case, the roaming signaling message carries two identifiers of the home core network device. The visited core network device may delete the identifier of the home core network device that is carried in the extension header field of the roaming signaling message, that is, retain the identifier of the home core network device that is carried in the header of the roaming signaling message. This reduces a quantity of bytes of the roaming signaling message and reduces network traffic.

Step 310: The visited SEPP sends a roaming signaling message obtained through the replacement to a home SEPP.

An identifier of the home SEPP is configured on the visited SEPP, and the visited SEPP sends the roaming signaling message obtained through the replacement to the home SEPP through an N32 interface, where a header of the roaming signaling message obtained through the replacement carries the identifier of the home core network device. After receiving the roaming signaling message, the visited SEPP forwards the roaming signaling message to the corresponding home core network device based on the identifier of the home core network device that is carried in the header of the roaming signaling message.

In the technical solution provided in this application, the visited core network device actively generates the roaming signaling message that carries the identifier of the visited SEPP and the identifier of the home core network device, such that security verification can be performed on the visited SEPP after the security certificate sent by the visited SEPP is received. In addition, the visited core network device may send the roaming signaling message that carries the identifier of the visited SEPP and the identifier of the home core network device to the visited SEPP, such that the visited SEPP can replace the identifier of the visited SEPP in the header of the roaming signaling message with the identifier of the home core network device, and forward the roaming signaling message obtained through the replacement to the home SEPP.

In comparison with the conventional technology, the visited core network device does not need to perform signaling interaction with the visited SEPP to obtain the identifier of the visited SEPP that meets a security verification requirement. This reduces a quantity of times of signaling interaction between the visited core network device and the visited SEPP, and saves network resources. In addition, the visited SEPP does not need to store a correspondence between a virtual identifier of the visited SEPP and an identifier of a home NRF in advance. In this way, storage resources are saved. After the visited SEPP recovers from a fault, the visited SEPP can quickly forward the received roaming signaling message based on parameters (the identifier of the home core network device and the identifier of the visited SEPP) carried in the roaming signaling message, and the correspondence does not need to be restored. This improves working stability of the visited SEPP, and reduces implementation and deployment costs of the SEPP.

Figure 4:
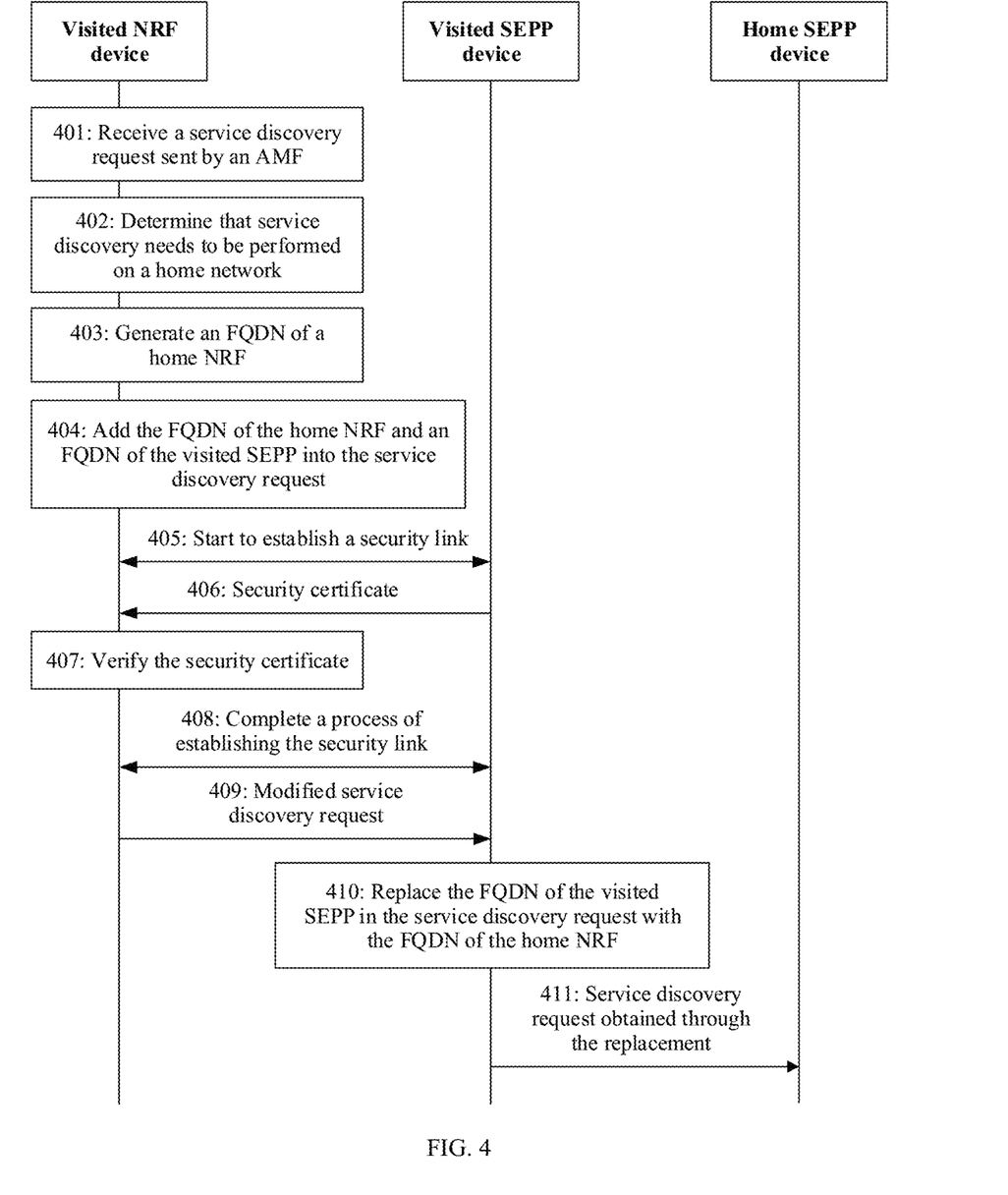
FIG. 4 is a flowchart of another roaming signaling message sending method according to an embodiment of this application.

For a more detailed understanding of the technical solutions of this application, the following further provides a message sending method in a roaming scenario. As shown in FIG. 4, the message sending method further provided in an embodiment of this application includes the following steps.

Step 401: A visited NRF receives a service discovery request sent by a visited AMF, where the service discovery request carries an identifier of a home network.

In this embodiment, UE roams from a home location to a visited location, and initiates a data service in the visited location; and after receiving a service request of the UE, the visited AMF performs network discovery on a visited core network device, to obtain an address of a UDM or a PCF (for example, a home UDM or a home PCF) that provides a service for the user equipment.

In this embodiment, the visited core network device is the visited NRF, and the visited AMF sends the service discovery request to the visited NRF, where the service discovery request carries the identifier of the home network, for example, a PLMN ID is 0x64f021. The service discovery request is sent using a Hypertext Transfer Protocol (HTTP) message.

The NRF supports a multi-layer structure. If a bottom-layer (first-layer) NRF cannot process the service discovery request, the service discovery request is conveyed upwards layer by layer until an NRF that can process the service discovery request is found. In this embodiment, these NRFs are considered as a whole.

Step 402: The visited NRF determines, based on the service discovery request, that service discovery needs to be performed on the home network.

In this embodiment, the NRF determines, based on the identifier of the home network in the service discovery request, that service discovery needs to be performed on a home core network device. In this embodiment, the home core network device is a home NRF.

Step 403: The visited NRF generates an identifier of the home NRF.

For example, the visited NRF generates the identifier of the home NRF based on the PLMN ID. The identifier of the home NRF is an FQDN of the home NRF, for example, nrf.5gc.mnc<MNC>.mcc<MCC>0.3gppnetwork.org. A mobile network code (MNC) and a mobile country code (MCC) may be obtained through conversion based on the identifier, such as the PLMN ID, of the home network.

In addition, an identifier of a visited SEPP is configured on the visited NRF, and the identifier of the visited SEPP is an FQDN of the visited SEPP, for example, sepp. visited-operator.com.

Step 404: The visited NRF adds the FQDN of the home NRF and the FQDN of the visited SEPP into the service discovery request.

In this embodiment, the visited NRF may pack the FQDN of the visited SEPP into a header of the service discovery request, and pack the FQDN of the home NRF into an extension field (or extension header field) of the service discovery request. For example, the visited NRF packs nrf.5gc.mnc<MNC>.mcc<MCC>0.3gppnetwork.org into an extension field 3gpp-sbi-target-FQDN of an https message.

Step 405: The visited NRF starts to establish a security link with the visited SEPP.

In this embodiment, the visited NRF and the SEPP send a hello message to each other to establish a TLS link. In a process of establishing the TLS link, the visited NRF receives a security certificate sent by the visited SEPP.

Step 406: The visited SEPP sends the security certificate to the visited NRF.

The security certificate of the visited SEPP may be sent to the visited NRF using a certificate message.

Step 407: The visited NRF verifies security of the visited SEPP.

In this embodiment, to prevent a spoofing attack, the visited NRF verifies the security of the visited SEPP.

For example, the visited NRF uses the FQDN in the header of the service discovery request to verify an FQDN carried in the received security certificate. The FQDN in the header of the service discovery request and the FQDN carried in the security certificate are both the FQDN of the visited SEPP. Therefore, the verification succeeds, that is, the visited NRF considers that the visited SEPP is secure.

Step 408: The visited NRF and the visited SEPP complete the process of establishing the security link.

In this embodiment, after the verification succeeds, the visited NRF and the visited SEPP continue the process of establishing the security link, for example, send a finished message to each other.

Step 409: The visited NRF sends, to the visited SEPP, the service discovery request into which the FQDN of the home NRF and the FQDN of the visited SEPP are added.

Because the security link is established between the visited NRF and the visited SEPP, the service discovery request may be sent to the visited SEPP using the https message.

The visited SEPP receives the service discovery request sent by the visited NRF, where the service discovery request is modified by the visited NRF, that is, the FQDN of the home NRF and the FQDN of the visited SEPP are added into the service discovery request.

Step 410: The visited SEPP replaces the FQDN of the visited SEPP in the service discovery request with the FQDN of the home NRF.

In this embodiment, after the visited SEPP receives the service discovery request, if the visited SEPP finds that the header carries the FQDN of the visited SEPP and the extension header field 3gpp-sbi-target-FQDN is carried, the visited SEPP replaces the FQDN in the header with the FQDN carried in the extension header field 3gpp-sbi-target-FQDN. In addition, the visited SEPP may further delete the extension header field 3gpp-sbi-target-FQDN of the service discovery request.

Step 411: The visited SEPP sends a service discovery request obtained through the replacement to a home SEPP.

An identifier of the home SEPP may be configured on the visited SEPP, and the visited SEPP may send the service discovery request obtained through the replacement to the home SEPP through an N32 interface, where the FQDN carried in the header of the service discovery request is nrf.5gc.mnc<MNC>.mcc<MCC>0.3gppnetwork.org. The visited SEPP may send the service discovery request obtained through the replacement to the home SEPP.

If the visited SEPP and the home SEPP are connected through IPX, the visited SEPP may pack (or encapsulate) the service discovery request obtained through the replacement into an https message body, and generate an N32-f message header. In this case, a header of the N32-f message header carries the FQDN of the home SEPP, and the visited SEPP sends, to the home SEPP, the https message into which the service discovery request is packed. After receiving the https message, the home SEPP obtains the service discovery request from the https message body, and sends the service discovery request to the home NRF.

The home SEPP forwards the service discovery request to the home NRF based on the FQDN carried in the header of the service discovery request, and the home NRF may further forward the service discovery request to the home UDM or the home PCF for corresponding service processing.

This embodiment describes in detail, using an example in which the NRF performs service discovery, the roaming signaling message sending method provided in this application. The roaming signaling message provided in this application may also be applied to a scenario in which an NSSF performs slice discovery. In this case, devices for signaling interaction are a visited NSSF and a visited SEPP. The roaming signaling message is a slice request. After receiving the slice request, the visited NSSF also performs the process in steps 401 to 409 in the foregoing embodiment. After receiving the slice request, the visited SEPP performs steps 410 and 411, to send the slice request to a home SEPP. The home SEPP may also forward the slice request to a corresponding home core network device, for example, a home NSSF, a home UDM, or a home PCF.

Figure 5:
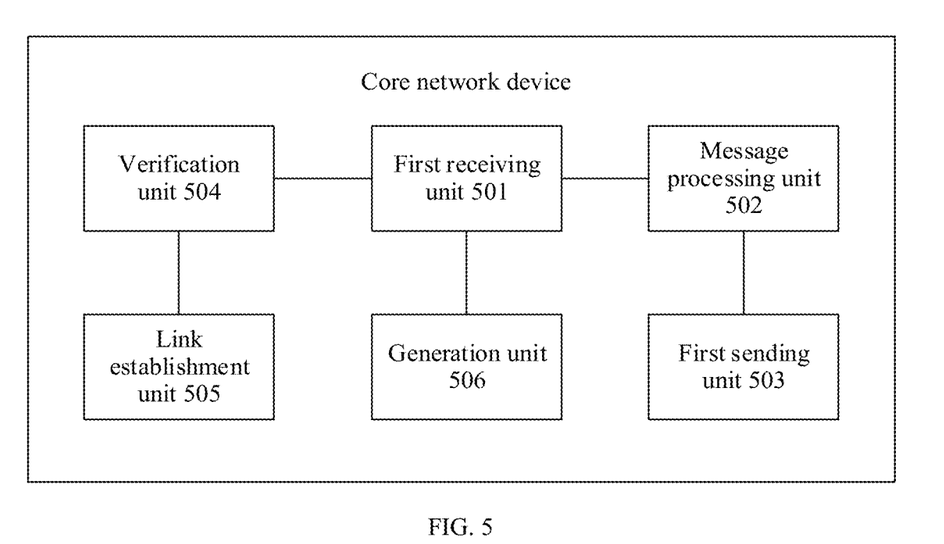
FIG. 5 is a schematic structural diagram of a core network device according to an embodiment of this application.

Based on a same concept as the method embodiments, an embodiment of this application further provides a core network device, configured to implement the method performed by the visited core network device in the method embodiments shown in FIG. 3 and FIG. 4. A structure of the core network device is shown in FIG. 5. The core network device mainly includes a first receiving unit 501, a message processing unit 502, and a first sending unit 503.

The first receiving unit 501 is configured to receive a roaming signaling message. The message processing unit 502 is configured to add an identifier of a home core network device and an identifier of a visited SEPP into the roaming signaling message. The first sending unit 503 is configured to send a roaming signaling message including the identifier of the home core network device and the identifier of the visited SEPP to the visited SEPP.

Through cooperation between the first receiving unit 501, the message processing unit 502, and the first sending unit 503, the visited core network device does not need to obtain a virtual identifier of the visited SEPP from the visited SEPP, but sends the roaming signaling message including the identifier of the home core network device and the identifier of the visited SEPP to the visited SEPP, such that the visited SEPP can forward the roaming signaling message to a home network based on the identifier of the home core network device. The core network device provided in this embodiment does not need to perform signaling interaction with the visited SEPP for a plurality of times. This saves system resources and improves message forwarding efficiency.

Still refer to FIG. 5. The visited core network device provided in this embodiment may further include: a link establishment unit 504 configured to start to establish a security link with the visited SEPP, where the first receiving unit 501 is further configured to receive a security certificate sent by the visited SEPP; and a verification unit 505 configured to verify, based on the identifier of the visited SEPP in the roaming signaling message, the security certificate received by the first receiving unit 501, where after the verification succeeds, the first sending unit 503 is further configured to send the roaming signaling message including the identifier of the home core network device and the identifier of the visited SEPP to the visited SEPP.

Through cooperation between the verification unit 505, the first sending unit 503, and the link establishment unit 504, security of communication between the visited core network device and the visited SEPP can be enhanced, and security of an entire mobile communications network can also be enhanced.

In an embodiment, the roaming signaling message received by the first receiving unit 501 in the visited core network device carries an identifier of the home network, and the visited core network device further includes: a generation unit 506 configured to generate the identifier of the home core network device based on the identifier of the home network.

In an embodiment, the identifier of the visited SEPP is located in a header of the roaming signaling message. To be more specific, the message processing unit 502 in the visited core network device adds the identifier of the visited SEPP into the header of the roaming signaling message, and adds the identifier of the home core network device into an extension field of the roaming signaling message, such that after receiving the roaming signaling message, the visited SEPP may determine that the message is to be sent to the visited SEPP, and perform replacement processing on the message.

The core network device in the foregoing embodiment is presented in a form of functional modules. The "module" herein may be specific hardware or an application-specific integrated circuit, a processor and a memory that execute one or more software or firmware programs, an integrated logic circuit, and/or another component that can provide the foregoing functions.

Figure 6:
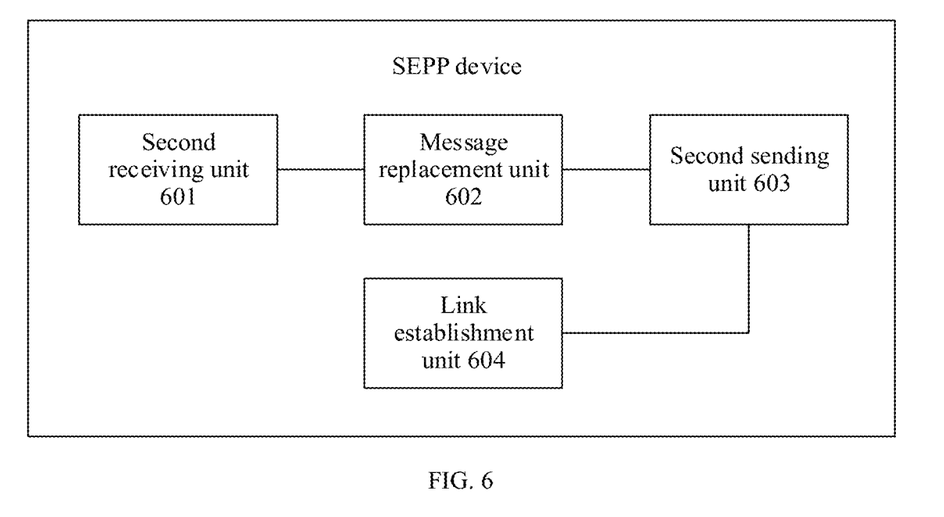
FIG. 6 is a schematic structural diagram of a SEPP device according to an embodiment of this application.

An embodiment of this application further provides a SEPP device configured to implement the method performed by the visited SEPP in the method embodiments shown in FIG. 3 and FIG. 4. A structure of the SEPP is shown in FIG. 6. The SEPP mainly includes a second receiving unit 601, a message replacement unit 602, and a second sending unit 603.

The second receiving unit 601 is configured to receive a roaming signaling message sent by a visited core network device, where the roaming signaling message includes an identifier of a home core network device and an identifier of the visited SEPP.

The message replacement unit 602 is configured to replace the identifier of the visited SEPP in the roaming signaling message with the identifier of the home core network device.

The second sending unit 603 is configured to send a roaming signaling message obtained through the replacement to a home SEPP.

Through cooperation between the second receiving unit 601, the message replacement unit 602, and the second sending unit 603, the visited SEPP may replace the identifier of the visited SEPP in the received roaming signaling message with the identifier of the home core network device in the roaming signaling message. The visited SEPP does not need to store a correspondence between a virtual identifier of the visited SEPP and an identifier of a home NRF in advance. This saves storage resources. Even after the visited SEPP recovers from a fault, the correspondence does not need to be restored. This improves working stability of the visited SEPP, and reduces implementation and deployment costs of the SEPP.

Still refer to FIG. 6. The visited SEPP provided in this embodiment may further include: a link establishment unit 604 configured to start to establish a security link with the visited core network device, where the second sending unit 603 is further configured to send a security certificate to the visited core network device.

In this embodiment, through cooperation between the link establishment unit 604 and the second sending unit 603, the security link can be established between the visited SEPP device and the visited core network device, and the security certificate can be sent to the visited core network device. This improves security of sending the security certificate.

In an embodiment, the message replacement unit 602 in the visited SEPP replaces the identifier of the visited SEPP in a header of the roaming signaling message with the identifier of the home core network device. In addition, the message replacement unit 602 may further delete the identifier of the home core network device that is carried in an extension field of the roaming signaling message. By replacing and deleting related fields, the home SEPP can identify the received roaming signaling message, and send the roaming signaling message to a corresponding home core network device for processing.

The SEPP in the foregoing embodiment is presented in a form of functional modules. The "module" herein may be specific hardware or an application-specific integrated circuit, a processor and a memory that execute one or more software or firmware programs, an integrated logic circuit, and/or another component that can provide the foregoing functions.

Figure 7:
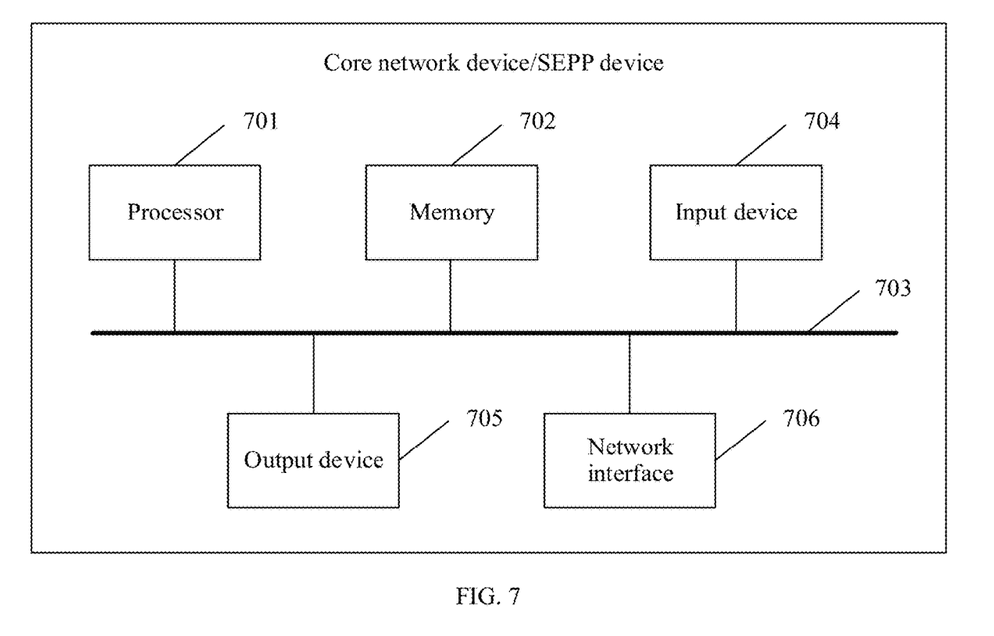
FIG. 7 is a schematic diagram of hardware of a core network device and a SEPP device according to an embodiment of this application.

FIG. 7 is a schematic diagram of hardware of a core network device and a SEPP device according to an embodiment of this application.

The core network device and the SEPP device that are provided in this embodiment each use general-purpose computer hardware, and include a processor 701, a memory 702, a bus 703, an input device 704, and an output device 705.

For example, the memory 702 may include a computer storage medium in a form of a volatile and/or nonvolatile memory, such as a read-only memory and/or a random access memory. The memory 702 may store an operating system, an application program, another program module, executable code, program data, user registration data, user subscription data, or the like.

The input device 704 may be configured to input a command and information to the core network device/the SEPP. The input device 704 is a keyboard or a pointing device, such as a mouse, a trackball, a touchpad, a microphone, a joystick, a game pad, a satellite TV antenna, a scanner, or a similar device. These input devices may be connected to the processor 701 through the bus 703.

The output device 705 may be configured for the core network device/the SEPP to output information. In addition to a monitor, the output device 705 may alternatively be another peripheral output device, such as a loudspeaker and/or a print device. These output devices may also be connected to the processor 701 through the bus 703.

The core network device/the SEPP device may be connected to a network, for example, connected to a local area network (LAN), through a network interface 706. In an environment in which a network is connected, computer-executable instructions stored on the core network device/the SEPP are not limited to being locally stored, but may be stored on a remote storage device.

When the processor 701 in the core network device executes the executable code or the application program stored in the memory 702, the core network device may perform the method steps performed by the visited core network device side in the foregoing embodiments, for example, perform steps 301 to 303, 306 and 307, 401 to 404, 407 to 409, and the like. For a specific execution process, refer to the foregoing embodiments. Details are not described herein again.

When the processor 701 in the SEPP device executes the executable code or the application program stored in the memory 702, the SEPP may perform the method steps performed by the visited SEPP side in the foregoing embodiments, for example, perform steps 304 and 305, 309 and 310, 405 and 406, 410 and 411, and the like. For an execution process, refer to the foregoing embodiments. Details are not described herein again.

In addition, the memory 702 stores computer-executable instructions used to implement functions of the first sending unit 503, the first receiving unit 501, and the message processing unit 502 in FIG. 5. Functions/implementation processes of the first sending unit 503, the first receiving unit 501, and the message processing unit 502 in FIG. 5 may be implemented by the processor 701 in FIG. 7 by invoking the computer-executable instructions stored in the memory 702. For a function and implementation process, refer to the foregoing related embodiments.

For the SEPP embodiment, the memory 702 stores computer-executable instructions used to implement functions of the second receiving unit 601, the message replacement unit 602, and the second sending unit 603 in FIG. 6. Functions/implementation processes of the second receiving unit 601, the message replacement unit 602, and the second sending unit 603 in FIG. 6 may be implemented by the processor 701 in FIG. 7 by invoking the computer-executable instructions stored in the memory 702. For a function and implementation process, refer to the foregoing related embodiments.

A "visited location" is relative to a "home location". For user equipment roaming to a current network, a core network device of the current network is a visited core network device, and a SEPP of the current network is a visited SEPP. The visited core network device may not only serve the user equipment roaming to the current network, but also serve local user equipment in the current network. The visited core network device in the foregoing embodiment may include a visited NRF device, a visited NSSF device, or the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can instruct the computer or the other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

What is claimed is:

1. A roaming signaling message sending method, wherein the method comprising:
   receiving, by a visited core network device, a roaming signaling message;
   adding, by the visited core network device, an identifier of a home core network device and an identifier of a visited security edge protection proxy (SEPP) device into the roaming signaling message to generate a modified roaming signaling message; and
   sending, by the visited core network device, the modified roaming signaling message to the visited SEPP device.

2. The roaming signal message sending method according to claim 1, wherein before sending the modified roaming signaling message to the visited SEPP device, the roaming signaling message sending method further comprises:
   starting, by the visited core network device, to establish a security link with the visited SEPP device;
   receiving, by the visited core network device, a security certificate from the visited SEPP device;
   verifying, by the visited core network device, the security certificate based on the identifier of the visited SEPP device; and
   succeeding the verification.

3. The roaming signaling message sending method according to claim 1, wherein the roaming signaling message carries an identifier of a home network, and wherein the roaming signaling message sending method further comprises generating, by the visited core network device, the identifier of the home core network device based on the identifier of the home network.

4. The roaming signaling message sending method according to claim 1, wherein generating the modified roaming signaling message comprises at least one of:
   adding, by the visited core network device, the identifier of the visited SEPP device into a header of the roaming signaling message; or
   adding, by the visited core network device, the identifier of the home core network device is added into an extension field of the roaming signaling message.

5. The roaming signaling message sending method according to claim 1, wherein the roaming signaling message is a service discovery request or a network slice request.

6. A roaming signaling message sending method, comprising:
   receiving, by a visited security edge protection proxy (SEPP) device, a roaming signaling message from a visited core network device, wherein the roaming signaling message comprises a first identifier of a home core network device and a second identifier of the visited SEPP device;
   replacing, by the visited SEPP device, the second identifier of the visited SEPP device in the roaming signaling message with the first identifier of the home core network device to obtain a modified roaming signaling message; and
   sending, by the visited SEPP device, & the modified roaming signaling message to a home SEPP device.

7. The roaming signaling message sending method according to claim 6, further comprising:
   starting, by the visited SEPP device, to establish a security link with the visited core network device; and
   sending, by the visited SEPP device, a security certificate to the visited core network device.

8. The roaming signal g message sending method according to claim 6, further comprising replacing by the visited SEPP device, the second identifier of the visited SEPP device in a header of the roaming signaling message with the first identifier of the home core network device.

9. The roaming signaling age sending method according to claim 6, wherein the first identifier of the home core network device is in an extension field of the roaming signaling message received from the visited core network device.

10. The roaming signaling message sending method according to claim 6, further comprising cancelling, by the visited SEPP device, the first identifier of the home core network device in the roaming signaling message from the visited core network device.

11. A core network device, comprising:
    at least one processor, and
    a memory coupled to the at least one processor and configured to store instructions that, wherein-when the instructions are executed by the at least one processor, cause the at least one processor to:
    receive a roaming signaling message;
    add an identifier of a home core network device and an identifier of a visited security edge protection proxy (SEPP) device into the roaming signaling message to generate a modified roaming signaling message; and
    send the modified roaming signaling message to the visited SEPP device.

12. The core network device according to claim 11, wherein the instructions further cause the processor to:
    start to establish a security link with the visited SEPP device, and receive a security certificate from the visited SEPP device;
    verify the security certificate based on the identifier of the visited SEPP device, and succeed the verification.

13. The core network device according to claim 11, wherein the roaming signaling message received by the visited-core network device carries an identifier of a home network, and wherein the instructions further cause the processor to: to generate the identifier of the home core network device based on the identifier of the home network.

14. The core network device according to claim 11, wherein the visited core network device generates the modified roaming signaling message by at least one of:
adding the identifier of the visited SEPP device into a header of the roaming signaling message; or
adding the identifier of the home core network device is added-into an extension field of the roaming signaling message.

15. The core network device according to claim 11, wherein the roaming signaling message is a service discovery request or a network slice request.

16. A visited security edge protection proxy (SEPP) device, comprising:
at least one processor, and
a memory coupled to the at least one processor and configured to store instructions that, when executed by the at least one processor, cause the at least one processor to:
receive a roaming signaling message from a visited core network device, wherein the roaming signaling message comprises a first identifier of a home core network device and a second identifier of the visited SEPP device;
replace the second identifier of the visited SEPP device in the roaming signaling message with the first identifier of the home core network device; and
send a modified roaming signaling message to a home SEPP device wherein the modified roaming signaling message is obtained through replacement of the second identifier with the first identifier.

17. The visited SEPP device according to claim 16, wherein the instructions further cause the processor to:
start to establish a security link with the visited core network device; and
send a security certificate to the visited core network device.

18. The visited SEPP device according to claim 16, wherein the visited SEPP device replaces the second identifier of the visited SEPP device in a header of the roaming signaling message with the first identifier of the home core network device.

19. The visited SEPP device according to claim 16, wherein the first identifier of the home core network device is in an extension field of the roaming signaling message received from the visited core network device.

20. The visited SEPP device according to claim 16, wherein the instructions further cause the processor to cancel the first identifier of the home core network device in the roaming signaling message received from the visited core network device.

* * * * *

UNITED STATES PATENT AND TRADEMARK OFFICE
CERTIFICATE OF CORRECTION

PATENT NO. : 12,144,059 B2
APPLICATION NO. : 17/708830
DATED : November 12, 2024
INVENTOR(S) : Guoqiang Shao It is certified that error appears in the above-identified patent and that said Letters Patent is hereby corrected as shown below:

In the Claims

Claim 1, Column 17, Lines 32-33: "method, wherein the method comprising:" should read "method, comprising:"

Claim 8, Column 18, Line 29: "roaming signal g message" should read "roaming signaling message"

Claim 8, Column 18, Line 30: "replacing by the" should read "replacing, by the"

Claim 9, Column 18, Line 34: "roaming signaling age sending" should read "roaming signaling message sending"

Claim 11, Column 18, Line 47: "that, wherein-when" should read "that, when"

Claim 11, Column 18, Lines 47-48: "when the instructions are executed by the" should read "when executed by the"

Claim 12, Column 18, Lines 60-61: "device, and receive" should read "device; and receive"

Claim 12, Column 18, Line 63: "device, and succeed" should read "device; and succeed"

Claim 13, Column 18, Lines 65-66: "by the visited-core network" should read "by the core network"

Claim 13, Column 19, Line 1: "processor to: to generate" should read "processor to generate"

Claim 14, Column 19, Line 4: "the visited core network" should read "the core network"

Claim 14, Column 19, Lines 8-9: "device is added-into an" should read "device into an"

Claim 16, Column 20, Line 2: "SEPP device wherein the" should read "SEPP device, wherein the"

Signed and Sealed this
Thirty-first Day of December, 2024

Derrick Brent
*Acting Director of the United States Patent and Trademark Office*